United States Patent
Paquier et al.

(10) Patent No.: US 9,666,180 B2
(45) Date of Patent: May 30, 2017

(54) SYNTHESIZED AUDIO MESSAGE OVER COMMUNICATION LINKS

(71) Applicant: Apple Inc., Cupertino, CA (US)

(72) Inventors: Baptiste P. Paquier, Saratoga, CA (US); Aram M. Lindahl, Cupertino, CA (US); Phillip G. Tamchina, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/849,433

(22) Filed: Sep. 9, 2015

(65) Prior Publication Data

US 2015/0379982 A1 Dec. 31, 2015

Related U.S. Application Data

(63) Continuation of application No. 12/613,636, filed on Nov. 6, 2009, now abandoned.

(51) Int. Cl.
| | |
|---|---|
| *H04M 1/725* | (2006.01) |
| *H04M 7/00* | (2006.01) |
| *G06F 17/30* | (2006.01) |
| *G10L 13/04* | (2013.01) |
| *G10L 13/00* | (2006.01) |
| *G10L 15/26* | (2006.01) |
| *G06F 3/16* | (2006.01) |
| *G10L 21/0216* | (2013.01) |
| *H04M 3/42* | (2006.01) |
| *G10L 21/0208* | (2013.01) |

(52) U.S. Cl.
CPC ............ *G10L 13/043* (2013.01); *G06F 3/165* (2013.01); *G10L 13/00* (2013.01); *G10L 15/26* (2013.01); *G10L 21/0216* (2013.01); *H04M 1/72552* (2013.01); *H04M 3/42382* (2013.01); *G10L 2021/02087* (2013.01); *H04M 2201/40* (2013.01); *H04M 2203/4536* (2013.01)

(58) Field of Classification Search
CPC ........... H04M 3/5322; H04M 1/72552; H04M 7/0042; G06F 3/16; G06F 17/30796
See application file for complete search history.

(56) References Cited

U.S. PATENT DOCUMENTS

| | | | |
|---|---|---|---|
| 5,860,064 A | 1/1999 | Henton | |
| 6,868,385 B1 | 3/2005 | Gerson | |
| 7,356,470 B2 | 4/2008 | Roth et al. | |
| 7,546,083 B2 | 6/2009 | Fadell | |
| 7,890,128 B1 | 2/2011 | Thomas et al. | |
| 2002/0025832 A1 | 2/2002 | Durian et al. | |
| 2003/0149565 A1 | 8/2003 | Chang et al. | |
| 2006/0095848 A1 | 5/2006 | Naik | |
| 2006/0149558 A1 | 7/2006 | Kahn et al. | |
| 2008/0043996 A1 | 2/2008 | Dolph et al. | |
| 2008/0150907 A1* | 6/2008 | Park ................. | H04M 1/72583 345/173 |
| 2011/0111805 A1 | 5/2011 | Paquier et al. | |

* cited by examiner

*Primary Examiner* — Andrew Wendell
(74) *Attorney, Agent, or Firm* — Sterne, Kessler, Goldstein & Fox, PLLC

(57) ABSTRACT

A communication device establishes an audio connection with a far-end user via a communication network. The communication device receives text input from a near-end user, and converts the text input into speech signals. The speech signals are transmitted to the far-end user using the established audio connection while muting audio input to its microphone. Other embodiments are also described and claimed.

20 Claims, 6 Drawing Sheets

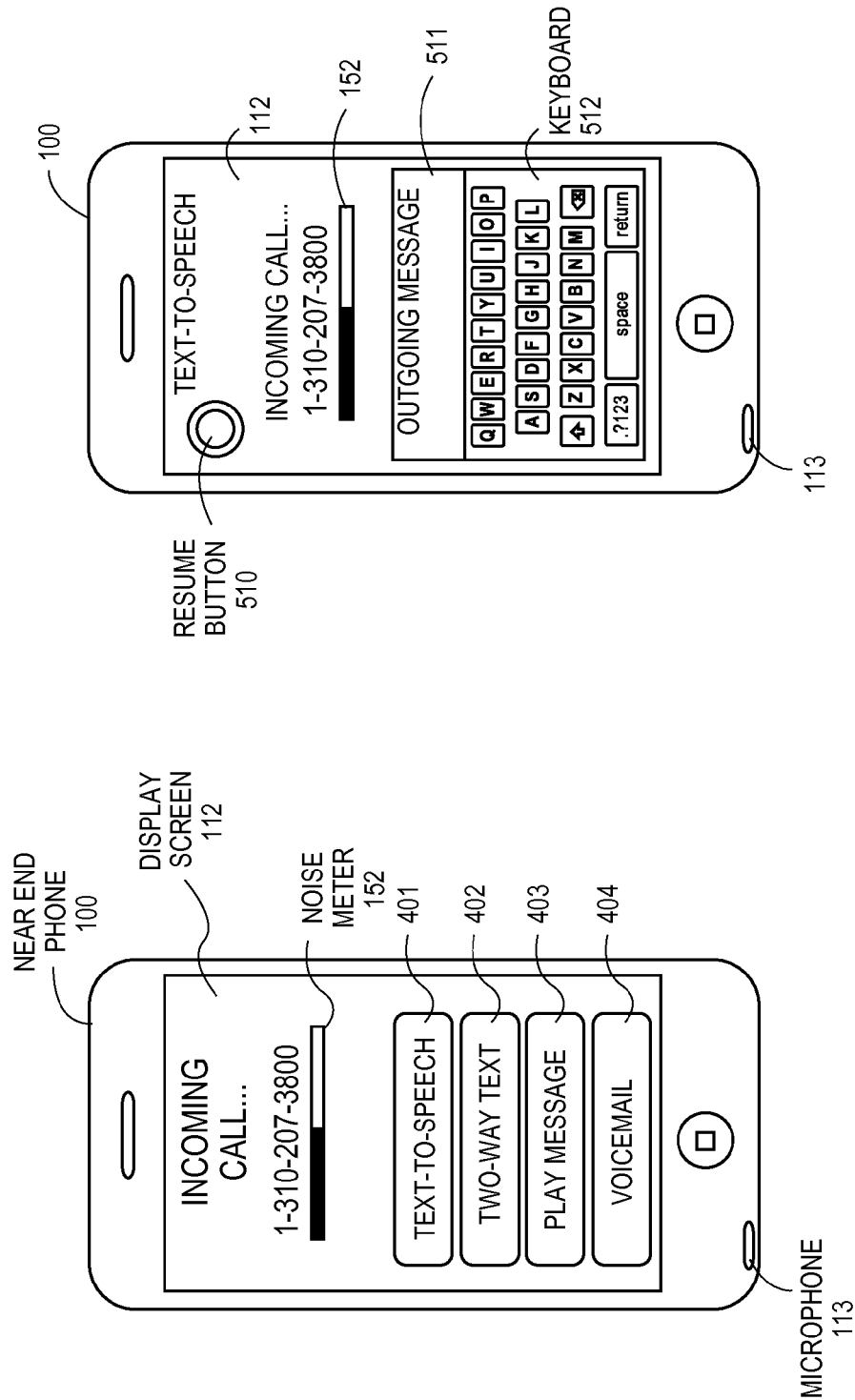

SYNTHESIZED AUDIO MESSAGE OVER COMMUNICATION LINKS

RELATED APPLICATIONS

The instant application is a continuation of, and hereby claims priority to, pending U.S. patent application Ser. No. 12/613,636, which was filed on 6 Nov. 2009, and which is incorporated by reference.

FIELD

An embodiment of the invention relates to audio synthesis by a communication device. Other embodiments are also described.

BACKGROUND

A user of a communication device (e.g., a telephone) may sometimes have to make or answer a phone call in a noisy environment. Noise can interfere with a phone conversation to a degree that the conversation is no longer intelligible to either conversing party. A user in the noisy environment may try to scream into the phone over the noise, but the screaming and the noise may render the voice signal unintelligible at the other end.

For example, a user may be talking on the phone in a busy restaurant. The user may not be able to shout loud enough into the phone to cover the noise in the restaurant. The user may not even be able to hear when the other end is talking. The noise may render the conversation unintelligible and may lead to a termination of the telephone conversation.

In another scenario, it may be inconvenient for a user to talk on a phone. For example, the user may be in a meeting and does not want to draw attention to himself by speaking into the phone. The user may try to whisper into the phone, but the whispering may render the conversation unintelligible. The user may choose to send a text message to the other party, but the other party may be on a landline where texting is unavailable, or may not have a texting plan.

It can be frustrating to conduct a telephone conversation when the environment is noisy or the circumstance is inappropriate for a user to speak.

SUMMARY

An embodiment of the invention is directed to a communication device, which establishes an audio connection with a far-end user via a communication network. The communication device receives text input from a near-end user, and converts the text input into speech signals. The speech signals are transmitted to the far-end user using the established audio connection while muting audio input to its audio receiving component.

In one embodiment, the communication device detects the noise level at the near end. When the noise level is above a threshold, the communication device can automatically activate or prompt the near-end user to activate text-to-speech conversion at any point of a communication such as a phone call. Alternatively, the communication device may playback a pre-recorded message to inform the far-end user of the near-end user's inability to speak due to the excessive noise at the near end.

In another embodiment, the near-end user can activate text-to-speech conversion whenever necessary regardless of the detected noise level. The near-end user can enter a text message, which is converted into speech signals for transmission via the established audio connection to the far-end user.

In yet another embodiment, the communication device can also perform speech-to-text conversion to convert the far-end user's speech into text for display on the communication device. This feature can be used when the far-end communication device cannot, or is not enabled to, send or receive text messages. The speech-to-text conversion and the text-to-speech conversion can be activated at the same time, or can be activated independent of each other. The far-end communication device communicates with the near-end communication device in audio signals, regardless of whether the speech-to-text conversion or the text-to-speech conversion is activated.

The communication device may be configured or programmed by its user, to support one or more of the above-described features.

The above summary does not include an exhaustive list of all aspects of embodiments of the present invention. It is contemplated that embodiments of the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to an or "one" embodiment of the invention in this disclosure are not necessarily to the same embodiment, and they mean at least one.

FIG. 4 shows an example of a communication device that provides an option for a near-end user to activate text-to-speech conversion.

FIG. 5 shows an example of a communication device that is activated to convert a near-end user's text input to speech.

DETAILED DESCRIPTION

Figure 1:
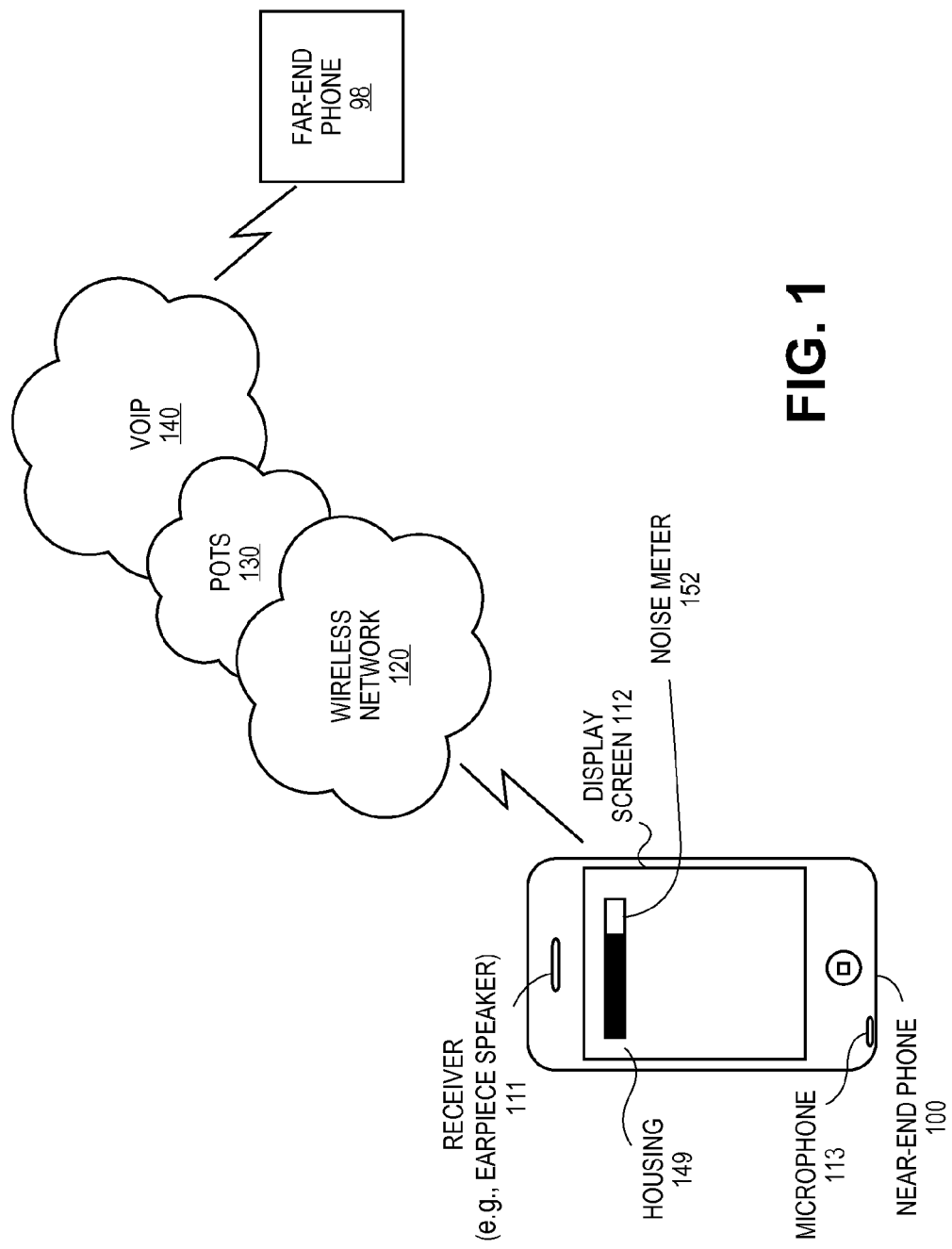
FIG. 1 is a diagram of a communication device operating to answer or receive a phone call.

FIG. 1 is a diagram illustrating a communication environment in which a near-end communication device (e.g., a near-end phone 100) is engaged in, or about to be engaged in, a communication (e.g., phone call) with a far-end communication device (e.g., a far-end phone 98) via a communication network (e.g., wireless network 120). The term "communication device" herein broadly refers to various real-time communication devices, e.g., landline telephone system (POTS) end stations, voice-over-IP end stations, cellular handsets, smart phones, computing devices, etc.

It should be understood that for ease of description in the present disclosure that the communication device is embodied as and described in terms of a phone. However, it should further be understood that this description should in no way be construed that the communication device is limited to this embodiment and instead can be embodied as a variety of communication devices as described above.

In one embodiment, the near-end communication device is a portable communication device that provides real-time mobile telephonic connections. For example, the near-end communication device can be a mobile phone or a mobile multi-functional device that can send and receive voice signals in a cellular communication network. In an alternative embodiment, the near-end communication device can be a computing device having communication capabilities. For example, the computing device may be a personal computer, workstation, personal digital assistant (PDA), etc.

The near-end communication device communicates with the far-end communication device over a communication network, for example, a wireless network 120, POTS 130, and a VOIP network 140. Communications between the near-end communication device and the wireless network 120 may be in accordance with known cellular telephone communication network protocols including, for example, global system for mobile communications (GSM), enhanced data rate for GSM evolution (EDGE), and worldwide interoperability for microwave access (WiMAX). The near-end communication device may also have a subscriber identity module (SIM) card, which is a detachable smart card that contains the subscription information of its user ("near-end user"), and may also contain a contacts list of the user. The near-end user may own the near-end communication device or may otherwise be its primary user. The near-end communication device may be assigned a unique address by a wireless or wireline telephony network operator, or an Internet Service Provider (ISP). For example, the unique address may be a domestic or international telephone number, an Internet Protocol (IP) address, or other unique identifiers. In other embodiments, the communication network may be embodied as a wired network, a wireless network, or a combination therein.

In one embodiment, the near-end communication device includes a microphone, a processor and a communication network interface. The processor is coupled to the microphone to detect a noise level received by the microphone, and to determine whether the noise level exceeds a threshold. The communication network interface transmits an audio signal to the far-end user using an audio connection that has been established between the near-end user and the far-end user. The audio signal conveys a message of the near-end user that is generated internally by the near-end communication device.

In an embodiment shown in FIG. 1, the near-end communication device is shown as the phone 100. Although the near-end phone 100 is shown and described, it is understood that the near-end phone 100 can be any of the communication devices mentioned above. The exterior of the near-end phone 100 is made of a housing 149 within which are integrated several components including a display screen 112, a receiver 111 (e.g., an earpiece speaker for generating sound) and one or more audio receiving components, such as a microphone 113 (e.g., a mouthpiece for picking up a near-end user's voice). Although one microphone 113 is shown and described, it is understood that the near-end phone 100 can include multiple microphones. Therefore, the term "microphone 113" described herein can be understood to represent one or more audio receiving components, such as one or more microphones. The near-end phone 100 may also implement noise suppression and/or acoustic echo cancellation (AEC) techniques to improve the sound quality received into the microphone 113. In one embodiment, the microphone 113 can be used to monitor the noise level in the environment surrounding the near-end phone 100. In an alternative embodiment, a separate microphone can be used to monitor the environmental noise. A noise meter 152 may be shown on the display screen 112 to indicate the detected noise level. The noise meter 152 may be shown when a phone call is made or received, when the noise level reaches the vicinity of a pre-determined threshold, or as long as the near-end phone 100 is powered on. The noise level may be indicated by the noise meter 152 by colors, numeral values, height or length of a bar indicator, etc.

Audio input to the microphone 113 can be analyzed by the near-end phone 100 to detect whether the noise level in the input exceeds a pre-determined threshold. For example, if the noise level exceeds the threshold, the near-end phone 100 can notify the user; by flashing the display screen 112 or displaying a popup on the display screen 112. The near-end phone 100 can provide an option to the near-end user to switch to text input. Alternatively, the near-end phone 100 can automatically switch the input mode from speech to text for the near-end user. In one embodiment, the near-end phone 100 mutes the microphone 113 and any other sound pick-up mechanisms (e.g., if there are multiple microphones) on the phone 100 after switched into text input mode. In one embodiment, muting the microphone 113 means that the audio input picked up by the microphone 113 is not transmitted to the far-end communication device. The muted microphone 113 may continue to detect the noise level in the surrounding environment.

The near-end phone 100 can convert the near-end user's text input into a speech signal, and transmits the speech signal to the far-end communication device. For example, the speech signal is transmitted to the far-end phone 98 via the communication network (e.g., the wireless network 120, the POTS 130, or the VOIP network 140). The text-to-speech conversion can be activated before the near-end user starts to speak to the near-end phone 100, or in the middle of a phone conversation. As the transmitted speech signal is synthesized internally by the near-end phone 100, the signal quality can be far better than the original speech of the near-end user in the noisy environment.

In an alternative embodiment, the near-end phone 100 may playback a pre-recorded audio message, automatically or under the near-end user's direction, when a high noise level is detected. With the use of either the text input or the pre-recorded message, the near-end user's message can be conveyed to a far-end user as noise-free audio signals via an audio connection in the communication network.

Turning to the far-end communication device, an embodiment of which is shown in FIG. 1 as the far-end phone 98, this device may receive or initiate a phone call with the near-end user. For example, the far-end phone 98 may be a mobile device or a land-based device that is coupled to a telephony network or other communication networks through wires or cables. The far-end phone 98 may be identified with a unique address, such as a telephone number within the public switched telephone network. The far-end phone 98 may also have an Internet protocol (IP) address if it performs calls through a voice over IP (VOIP) protocol. The far-end phone 98 may be a cellular handset, a telephone service (POTS), analog telephone, a VOIP telephone station, or a desktop or notebook computer running telephony or other communication software. The far-end phone 98 may or may not have the capabilities to receive text messages.

The far-end phone 98 is associated with a far-end user. The far-end user can be a person, or an automated entity with synthesized speech capability (e.g., an interactive voice response system).

Figure 2:
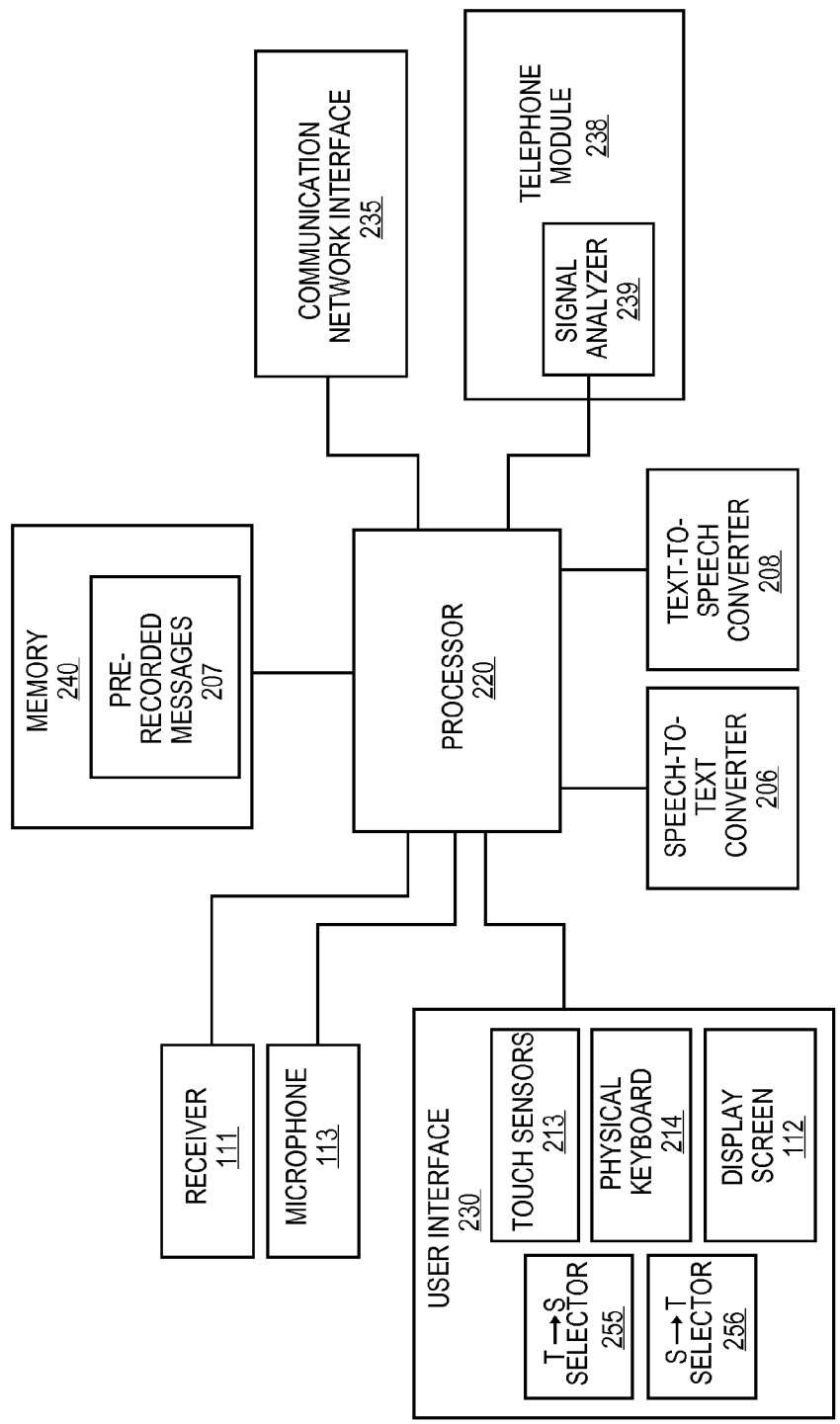
FIG. 2 is a block diagram illustrating an embodiment of the components of the communication device.

FIG. 2 is a block diagram illustrating an embodiment of the near-end phone 100. The near-end phone 100 includes a communication network interface 235 for receiving and transmitting communication signals, e.g., audio, video and/or data signals. The near-end phone 100 also includes the receiver 111 for generating audio signals in response to an incoming call signal and the microphone 113 for picking up the speech signal of the near-end user. The near-end phone 100 also includes a user interface 230. The user interface 230 includes the display screen 112 and touch sensors 213 for sensing user's touch and motion. The near-end phone 100 may include a physical keyboard 214 for receiving keystroke input from the user, or a virtual keyboard displayed by display screen 12 for accepting user input via the touch sensors 213. The touch sensors 213 may be based on resistive sensing, capacitive sensing, optical sensing, force sensing, surface acoustic wave sensing, and/or other sensing techniques or combinations of sensing techniques. The coordinates of the touch sensors 213 that respond to the user's touch and motion (e.g. gestures) represent a specific user input. The touch sensors 213 may be embedded in the display screen 112, or may be embedded in a touch-sensing panel separate from the display screen 112. In other embodiments, the near-end phone 100 may include other types of sensors for accepting user inputs other than touch input including a motion sensor such as an accelerometer. For example a user may provide an input by shaking the near-end phone 100 or moving the phone in a particular manner.

In one embodiment, the user input interface 230 may include one or more buttons (referred to as "T→S selector 255") for invoking a text-to-speech feature. The T→S selector 255 may be a physical button or a virtual button. The physical button may be a dedicated "text-to-speech" button, or one or more buttons identified by the text shown on the display screen 112 (e.g., "press #*1 to activate text-to-speech conversion"). In an embodiment where the T→S selector 255 is a virtual button, the virtual button may be embedded in the display screen 112 that includes the touch sensors 213. The display screen 112 may show a graphical "text-to-speech" virtual button that can be pressed by the user to invoke text-to-speech conversion. In an alternative embodiment, the T→S selector 255 may be a virtual button implemented on a touch-sensing panel separate from the display screen 112. A user can use the touch-sensing panel to direct a cursor on the display screen 112 to select a graphical "text-to-speech" button shown on the display screen 112. In alternative embodiments, text-to-speech conversion may be activated by a combination of one or more physical buttons and virtual buttons. When a near-end user selects the T→S selector 255, a text-to-speech converter 208 of the near-end phone 100 is activated. The text-to-speech converter 208 can be used to convert the near-end user's text input into speech for transmission to a far-end user.

In one embodiment, the user input interface 230 also includes one or more buttons (referred to as "S→T selector 256") for invoking speech-to-text conversion. The S→T selector 256 can be implemented by physical or virtual button mechanisms, similar to the implementation of the T→S selector 255. When a near-end user selects the S→T selector 256, a speech-to-text converter 206 of the near-end phone 100 is activated. The speech-to-text converter 206 can be used to convert a far-end user's speech into text for displaying on the display screen 112.

The text-to-speech converter 208 may be implemented with hardware circuitry, firmware, software or any combination thereof. If implemented in software and/or firmware, the software and firmware may be stored within memory 240 in the near-end phone 100 and executed by a processor 220. Alternatively, the firmware/software may not be stored within the memory 240 in the near-end phone 100. The text-to-speech converter 208 converts the text input into a speech signal based on one or more speech synthesis techniques. The synthesized speech can be created by concatenating pieces of recorded speech stored in the memory 240. The text-to-speech converter 208 may be activated and deactivated by input to the user interface 230.

The speech-to-text converter 206 may be implemented with hardware circuitry, firmware, software or any combination thereof. If implemented in software and/or firmware, the software and firmware may be stored within the memory 240 in the near-end phone 100 and executed by the processor 220. Alternatively, the firmware/software may not be stored within memory in the near-end phone 100. The speech-to-text converter 206 identifies the words in an input speech signal based on one or more speech recognition techniques, and causes the display screen 112 to show the recognized words in text. The speech-to-text converter 206 may be activated and deactivated by input to the user interface 230.

Still referring to FIG. 2, in one embodiment, the near-end phone 100 also includes a telephone module 238 which is responsible for coordinating various tasks involved in a phone call. The telephone module 238 may be implemented with hardware circuitry, firmware, software or any combination thereof. If implemented in software and/or firmware, the software and firmware may be stored within memory 240 in the near-end phone 100 and executed by the processor 220. Although one processor 220 is shown, it is understood that any number of processors or data processing elements may be included in the near-end phone 100. The telephone module 238 coordinates tasks such as receiving an incoming call signal, placing an outgoing call, activating speech-to-text conversion, activating text-to-speech conversion, playing back pre-recorded messages 207 in the memory 240 and directing a call to a voicemail system.

In one embodiment, the telephone module 238 includes a signal analyzer 239 to analyze the noise received at the near-end phone 100. The signal analyzer 239 compares the noise level with a pre-determined threshold, which may be configurable by the near-end user, to determine whether to alert the near-end user of the high noise level, whether to trigger speech synthesis, and/or whether to playback a pre-recorded message.

The term "noise" herein refers to broadband environmental noise signals surrounding the near-end phone 100. The signal analyzer 239 receives the audio signals picked up by the microphone 113, and determines whether the noise level in the audio signal exceeds a threshold. The term "noise level" or "audio noise level" herein refers to an absolute level of the noise, a relative level of the noise with respect to the desired signal (e.g., the near-end user's speech), or a combination of the absolute level and the relative level of the noise. The noise level can be determined based on one or more factors, including but not limited to, signal-to-noise (SNR) ratio, noise volume (e.g., 70-80 db), combined signal volume and the noise volume, etc. The SNR can be used to measure whether the speech signal strength of the near-end user is relatively low in comparison to the noise signal strength. The combined signal and noise volume can be used to determine whether the microphone 113 has reached or come close to a saturation point that distorts the received audio signal. If the near-end user has not started to speak on the near-end phone 100, the noise level may be determined purely based on the detected noise volume. If the near-end user has already started to speak on the near-end phone 100, the noise level may be determined based on a combination of the near-end user's speech signals and the environmental noise.

In response to the detection of a particular or relative noise level, the near-end phone 100 may provide the near-end user an option to activate text-to-speech conversion. The user interface 230 may display a virtual button implementing the T→S selector 225 on the display screen 112, or may display a message indicating the physical buttons for activating the text-to-speech conversion. Alternatively, the activation of the text-to-speech conversion may be automatic upon detection of a particular or relative noise level at the near end. When the noise level exceeds a particular or relative threshold, the near-end phone 100 may automatically mute the microphone 113 and prompt the near-end user to enter text or to select a text-message stored in the memory 240. In one embodiment, all of the signals picked up by the microphone 113 are bypassed without being transmitted to the far-end user.

The text-to-speech conversion can occur anytime after an audio connection in the communication network (e.g., the wireless network 120, the POTS 130, or the VOIP network 140) is established between the near-end user and the far-end user. The conversion causes no interruption to the established audio connection. For example, the near-end user may have placed or picked up a phone call but have not begun to speak with the far-end user. Alternatively, the near-end user may be in the middle of a phone conversation with the far-end user when he activates the text-to-speech conversion.

In yet another alternative embodiment, upon being alerted of the particular or relative noise level, the near-end user may select one of the pre-recorded messages 207 in the memory 240. The pre-recorded message 207 may inform the far-end user that the text-to-speech feature is to be activated, or may ask the far-end user to leave a message or to call back at a later time.

Additional circuitry, including a combination of hardware circuitry and software, can be included to obtain the needed functionality described herein. These are not described in detail as they would be readily apparent to those of ordinary skill in the art of mobile phone circuits and software.

Figure 3:
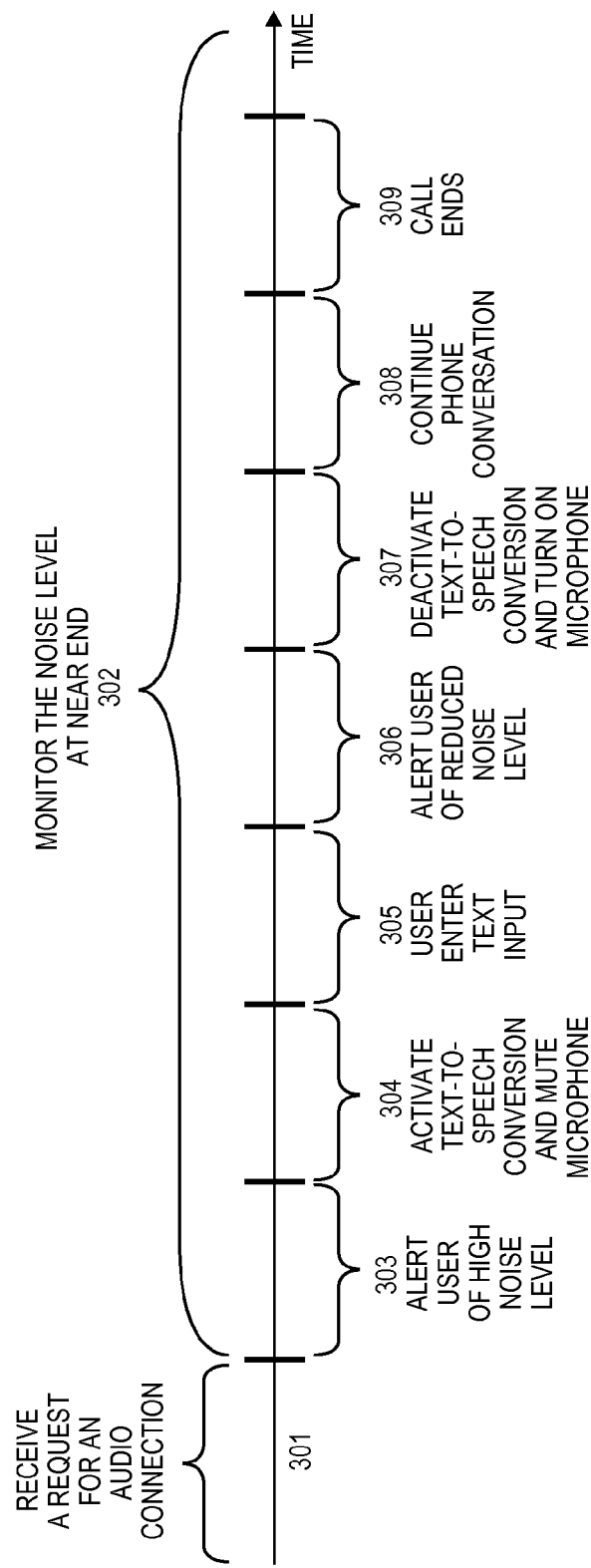
FIG. 3 is an example of a timeline of events that occur while processing a phone call for a near-end user in a noisy environment.

An example of a timeline for operating the near-end phone 100 in a noisy environment is shown in FIG. 3. Referring to FIG. 3, operation may begin when the near-end phone 100 receives a request to establish an audio connection with the far-end phone 98 via a communication network (301). The request may originate from the near-end user (e.g., when the near-end user dials the telephone number of the far-end phone 98), or from the far-end user (e.g., when the far-end user dials the telephone number of the near-end phone 100). In response to the request, the near-end phone 100 begins the process for establishing an audio connection, and, in the meantime, may be monitoring the noise level in the environment where the near-end phone 100 is located (302). The near-end phone 100 may continuously monitor the noise level after the near-end phone 100 is powered on, or may start monitoring the noise level when triggered by an event, such as when receiving the aforementioned request to establish an audio connection, when the cover of the near-end phone 100 is flipped or slid open, or when a button of the near-end phone 100 is pressed. It should be noted that noise level may be actively monitored or passively detected.

After the audio connection is established, the near-end phone 100 continues to monitor the noise level received by the near-end phone 100. If the near-end phone 100 detects that the noise level at the near end is above a pre-determined threshold, the near-end phone 100 alerts the near-end user of the high noise level (303). The near-end phone 100 may automatically switch to text input mode or present the user with an option to switch to text input. When the input mode is switched to text, the text-to-speech conversion is activated and the microphone 113 is muted (304). At this time, the user can begin to enter a text message (305), which is converted by the text-to-speech converter 208 into a speech signal. The near-end phone 100 may playback a voice message before the transmission of the converted speech to indicate to the far-end user that speech synthesis at the near end has been activated. The far-end user may continue to speak into the far-end phone 98 without being affected by the speech synthesis performed at the near end.

In one scenario, the noise level may drop at the near end before the phone call ends. The near-end phone 100 may alert the near-end user upon detection of reduced noise level (306). The near-end phone 100 may automatically switch back to speech input mode or present the user with an option to switch back to speech input. When the input mode is switched back to speech, the text-to-speech conversion is deactivated and the microphone 113 is turned back on (307). The near-end user and the far-end user can continue the phone conversation (308) until one or both of the parties end the call (309).

The text-to-speech conversion may also be used in a non-noisy environment. In one embodiment, the near-end phone 100 allows the near-end user to activate text-to-speech conversion when the detected noise level is still below the threshold. This feature can be useful when the near-end user is in an environment where talking on the phone is inappropriate (e.g., in a meeting). Referring to FIG. 3, if the detected noise level is below the threshold at time 302, the near-end user may switch to text input after an audio connection is established with the far-end user. The near-end user may use an option provided by the near-end phone to activate text-to-speech conversion. If, during the phone call, the near-end user wishes to switch back to speech input, the near-end user can deactivate the text-to-speech conversion, which turns the microphone 113 back on. Operation of the near-end phone 100 in a non-noisy environment can be the same as the operation described above in 301, 304, 305 and 307-309 of FIG. 3.

In one scenario, the near-end user may be wearing a headset such that the voice of the far-end user can be heard clearly in the presence of the external noise. Thus, the near-end user can hear the far-end user's speech and enter text messages in response. In some other scenarios, the near-end user may not have a headset when the noise is loud. Alternatively, in a non-noisy environment (e.g., in a meeting), it may be inappropriate for the near-end user to hold the phone to the ear or place an earphone into the ear. In these scenarios, the near-end user may activate speech-to-text conversion at the near-end phone 100, which converts the far-end user's speech into text and displays the text on the display screen 112. With the activation of both speech-to-text and text-to-speech conversions, the near-end user can enter and receive text messages, and the far-end user can receive and answer the near-end user in regular speech.

The activation of the speech-to-text conversion may occur before the start of a phone conversation or during the phone conversation. The speech-to-text conversion may be activated by the near-end user or automatically when the detected noise level is above a threshold. The speech-to-text conversion may be activated independently of the activation of text-to-speech conversion, or may be activated at the same time with the text-to-speech conversion. The activation of the speech-to-text conversion does not interrupt the established audio connection between the near-end and far-end users.

The activation of the speech-to-text conversion may be controlled by the near-end user or may be automatic. In one embodiment, when a relative or particular noise level is detected at the near end, the near-end phone 100 may automatically convert the far-end user's speech to text. Additionally, the near-end phone 100 may also automatically deactivate the speech-to-text conversion of the far-end user's speech, or provide the near-end user an option to stop converting the far-end user's speech into text.

FIG. 4 shows an example of the near-end phone 100 that provides a number of options for the near-end user, including an option to activate text-to-speech conversion. Although the near-end phone 100 is shown in FIG. 4 as a mobile phone, it is understood that other communication devices can also be used.

Referring to FIG. 4, in response to the detection of the relative or particular noise level at the near end, the near-end phone 100 displays a number of options for the user to choose. The options may include: text-to-speech 401, two-way text 402, play (pre-recorded) message 403, and voicemail 404. The user may select one of these options using a physical button or a virtual button. In one embodiment, the near-end phone 100 also displays the noise meter 152 on the display screen 112 to provide a visual indication of the environmental noise level at the near-end.

The display screen 112 also shows "INCOMING CALL . . . " or "OUTGOING CALL . . . " depending on the direction of the call, as well as the number assigned to the far-end user. In one embodiment where the near-end phone 100 stores a list of contacts including their nicknames and numbers, the display screen 112 may show the nickname of the far-end user in addition to or instead of the assigned number.

Referring to FIG. 5, if the near-end user selects the text-to-speech option 401, the display screen 112 may show "TEXT TO SPEECH" to indicate that the text-to-speech conversion has been activated. The near-end user may use a physical keyboard or a virtual keyboard (such as a virtual keyboard 512 presented on the display screen 112 in which touch sensors are embedded) to input text messages. The display screen 112 also shows an outgoing message area 511 that displays the text entered by the near-end user. As the near-end user inputs the text, the text-to-speech converter 208 (FIG. 2) automatically converts the text into speech. The near-end phone 100 transmits the converted speech signal to the far-end user, utilizing the audio connection that has already been established between the near-end user and the far-end user.

In some scenarios, the near-end user may wish to activate text-to-speech conversion even though the external noise level has not exceeded a threshold. In one embodiment, the near-end user may be provided with the text-to-speech option 401 after an audio connection is established with a far-end user regardless of the noise level at the near end.

Alternatively or additionally, the near-end user may press one or more physical buttons on the near-end phone 100 to activate the text-to-speech conversion, or to cause the display of the text-to-speech option 401 on the display screen 112.

After activation of the text-to-speech conversion, if the noise level drops below a threshold, the near-end phone 100 may present a resume option 510 for the near-end user to resume speaking to near-end phone 100. Once the resume option 510 is selected, the text-to-speech conversion is deactivated and the microphone 113 is turned back on. In an alternative embodiment, the resume option 510 may be provided regardless of the detected noise level.

If the near-end user wishes to receive text messages instead of speech signals from the far-end user, the near-end user may activate speech-to-text conversion after an audio connection is established with the far-end user. The example of FIG. 4 shows an embodiment in which the speech-to-text conversion and the text-to-speech conversion can be activated at the same time by selecting the two-way text 402 option. In an alternative embodiment, the speech-to-text conversion may be activated independently of the text-to-speech conversion.

Figure 6:
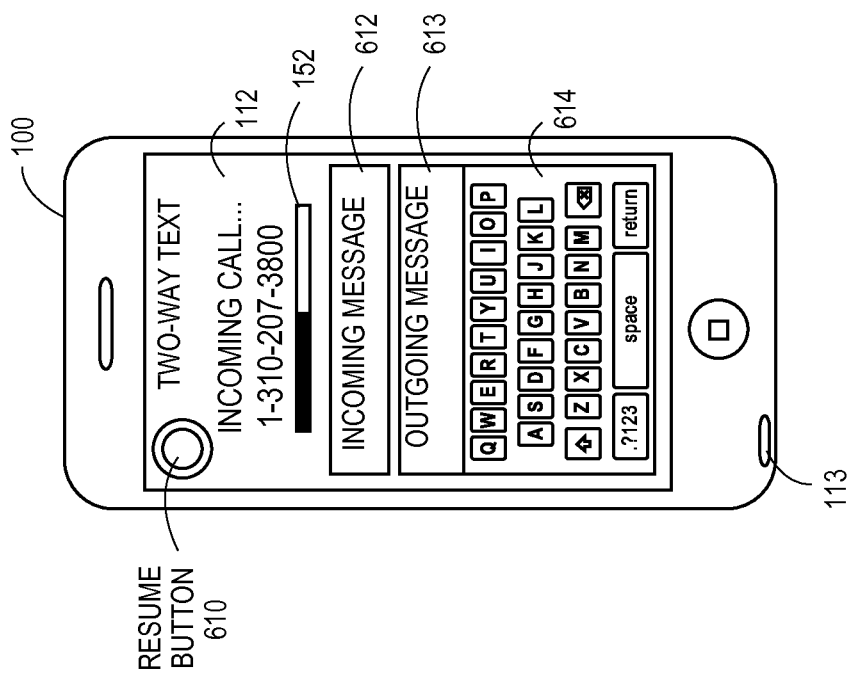
FIG. 6 shows an example of a communication device that is activated to convert a near-end user's text input to speech and a far-end user's speech into text.

Referring to FIG. 6, if the user selects the two-way text 402 option, the display screen 112 may show "TWO-WAY TEXT" to indicate that both of the text-to-speech and speech-to-text conversions have been activated. The near-end user may use a physical keyboard or a virtual keyboard (such as a virtual keyboard 614 presented on the display screen 112 in which touch sensors are embedded) to input text messages. The display screen 112 shows an incoming message area 612 for displaying the text converted from the far-end user, and an outgoing message area 613 for displaying the text entered by the near-end user. The established audio connection carries two-way voice signals between the near-end and the far-end users. The conversions from text to speech and from speech to text are performed by the near-end phone 100. The far-end user can speak to the far-end phone 98 in the same way as in a normal telephone conversation that does not involve text messages.

In a scenario where the near-end user wishes to activate speech-to-text conversion even though the external noise level has not exceeded a threshold, the near-end user may be provided with the two-way text option 402 after an audio connection is established with a far-end user. Alternatively or additionally, the near-end user may be provided with a separate speech-to-text option (not shown), or press one or more physical buttons on the near-end phone 100 to activate the speech-to-text conversion.

After activation of the two-way text-to-speech and speech-to-text conversions, if the noise level drops below a threshold, the near-end phone 100 may present a resume option 610 for the near-end user to resume a two-way speech conversation. Once the resume option 610 is selected, the two-way conversions are deactivated and the microphone 113 is turned back on. In an alternative embodiment, the resume option 610 may be provided regardless of the detected noise level.

Referring again to FIG. 4, if the near-end user selects the play message option 403, a pre-recorded default message can be played to the far-end user. For example, the default message may indicate that it is too noisy for the near-end user to speak on the phone and the near-end user will call back later. The near-end user can record any suitable message as the default message when setting up the near-end phone 100. Alternatively, the near-end phone 100 may provide the near-end user with a number of additional options, each associated with a different pre-recorded message. The near-end user may select a pre-recorded message that best suits the current situation. After the message is played to the far-end user, the near-end phone 100 may terminate the call, or hold the call to receive further input from the near-end user.

If the near-end user selects the voicemail option 404, the far-end user will be re-directed to a voicemail system to leave a voice message. The near-end user will be able to retrieve the message from the voicemail system at a later time. The message left by the far-end user may be stored in the memory 240 of the near-end phone 100, or it may be stored in a remote voicemail server.

Regardless of which option is selected in FIGS. 4-6, the established audio connection between the near-end and far-end users is uninterrupted until one or both users terminate the phone call.

Figure 7:
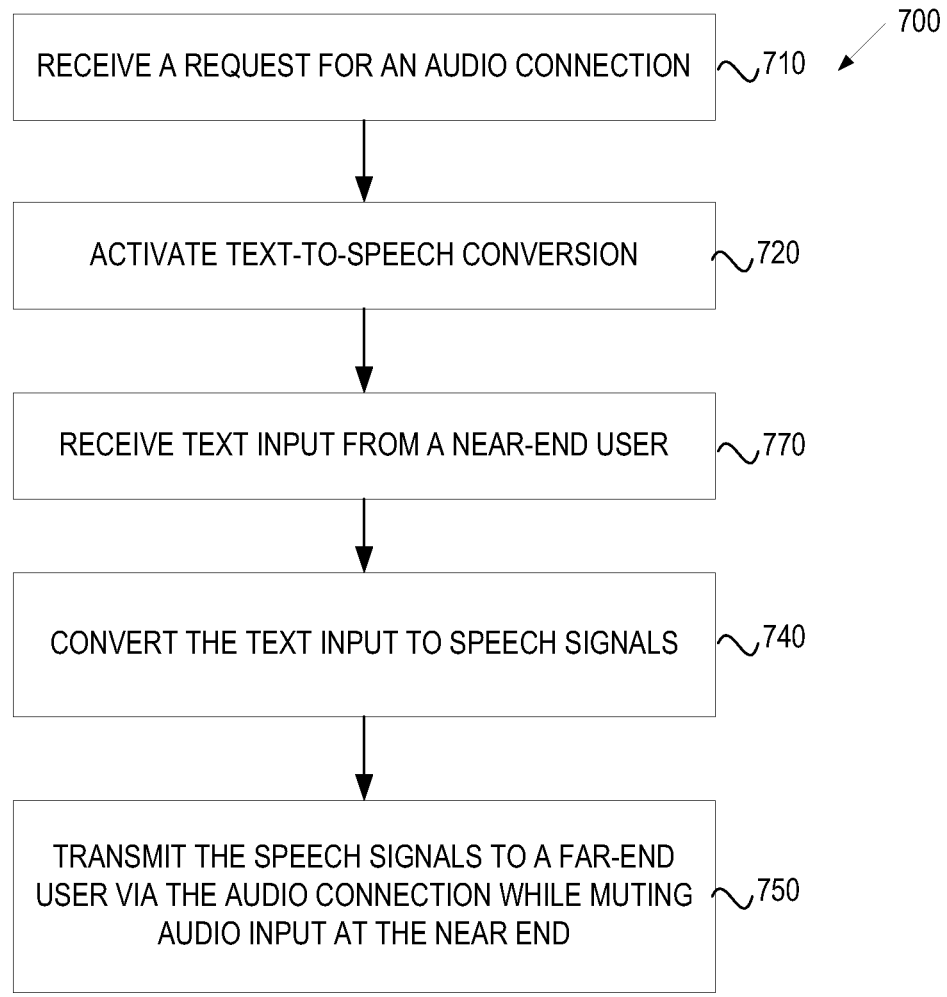
FIG. 7 is a flow diagram illustrating an embodiment of a method for generating and transmitting synthesized speech signals.

FIG. 7 is a flow diagram illustrating an embodiment of a method 700 for generating synthesized speech signals at a near-end communication device (e.g., the near-end phone 100), and transmitting the synthesized speech signals to a far-end communication device (e.g., the far-end phone 98). The method 700 may be performed by a communication device that may comprise hardware (e.g., circuitry, dedicated logic, programmable logic, microcode, etc.), firmware, software (e.g., instructions run on a processing device to perform hardware simulation), or a combination thereof.

The method 700 begins when a near-end communication device receives a request for an audio connection (710). In one embodiment, the near-end communication device detects the noise level in the surrounding environment as exceeding a threshold, and causes the activation of or the recommendation to active the text-to-speech conversion (720). In alternative embodiment, the near-end communication device may receive a near-end user's input to activate the text-to-speech conversion even if the detected noise level is below the threshold. After the activation of the text-to-speech conversion, the near-end communication device receives text input from the near-end user (730). The near-end communication device then converts the text input into speech signals using speech synthesis techniques (740). The near-end communication device transmits the speech signal to the far-end communication device via the established audio connection, while muting the audio input to the near-end communication device (750).

In general, the near-end communication device (e.g., the telephone module 238 of FIG. 2) may be configured or programmed by the user to support one or more of the above-described features.

To conclude, various ways of using speech synthesis in a communication device (e.g., a portable communication device, mobile phone etc.) have been described. These techniques allow a person to use his phone when the environment is noisy or the circumstance is inappropriate for him to speak. As explained above, an embodiment of the invention may be a machine-readable storage medium (such as the memory 240 of FIG. 2) having stored thereon instructions which program a processor to perform some of the operations described above. In other embodiments, some of these operations might be performed by specific hardware components that contain hardwired logic. Those operations might alternatively be performed by any combination of programmed data processing components and custom hardware components.

The invention is not limited to the specific embodiments described above. Accordingly, other embodiments are within the scope of the claims.

What is claimed is:

1. A method performed by a near end communication device, the method comprising:
    establishing an audio connection between the near-end communication device and a far-end communication device via a communication network;
    detecting a noise level in an audio input to the near-end communication device;
    providing an option to activate text-to-speech conversion on a display screen of the near-end communications device based at least in part on the noise level;
    activating text-to-speech conversion at the near-end communication device in response to the option to activate text-to-speech conversion being selected;
    prompting for text input based at least in part on the activating;
    receiving text input at the near-end communication device based at least in part on the prompting;
    converting the text input into speech signals at the near-end communication device; and
    transmitting the speech signals to the far-end communication device using the audio connection, wherein the transmitting is performed while muting the audio input to the communication device, and the muting is based at least in part on the activating.

2. The method of claim 1, wherein the detecting the noise level comprises:
    detecting the noise level based at least in part on a combination of signal to noise ratio, noise volume, and combined signal and noise volume.

3. The method of claim 1, further comprising:
    detecting the noise level as below a threshold value after the text-to-speech conversion is activated; and
    deactivating the text-to-speech conversion based at least in part on the noise level being below the threshold value.

4. The method of claim 1, further comprising:
    activating speech-to-text conversion to convert voice from the far-end communication device into text based at least in part on the noise level exceeding the threshold value.

5. The method of claim 1, further comprising:
    activating speech-to-text conversion after establishment of the audio connection between the near-end communication device and the far-end communication device;
    converting voice from the far-end communication device transmitted over the audio connection into text; and
    displaying the text on the display screen of the near-end communication device.

6. The method of claim 1, wherein the near-end communication device is a mobile phone.

7. The method of claim 1, wherein the prompting comprises:
    enabling a user interface on the display screen of the near-end communications device to receive the text input.

8. A communication device, comprising:
    a microphone;
    a display screen;
    a processor coupled to the microphone and the display screen and configured to:
        detect a noise level in an audio input to the communication device;
        determine whether the noise level exceeds a threshold value;

provide an option to activate text-to-speech conversion on the display screen of the communications device based at least in part on the noise level exceeding the threshold value;

activate text-to-speech conversion at the communication in response to the option to activate text-to-speech conversion being selected; and prompt for text input based at least in part on the activating; and a communication network interface to address an audio signal to a far-end communication device that is to be transmitted using an audio connection that has been established between the communication device and the far-end communication device via a communication network, wherein the processor is to cause audio input from the microphone to be muted based at least in part on the activating, and the audio signal conveys a message that is generated internally by the communication device based at least in part on the prompting.

9. The communication device of claim 8, further comprising:
a text-to-speech converter to convert text input of the communication device into the message that is conveyed by the audio signal.

10. The communication device of claim 8, further comprising:
a speech-to-text converter to convert voice from the far-end communication device transmitted over the audio connection into text; and
wherein the display screen shows the text on the communication device.

11. The communication device of claim 8, further comprising:
a user interface to enable the communication device to activate text-to-speech conversion of a text message to the far-end communication device over the audio connection.

12. The communication device of claim 8, further comprising:
a user interface to enable the communication device to playback a pre-recorded message stored in memory to the far-end communication device over the audio connection.

13. The communication device of claim 8, wherein the display screen is enabled to show a noise meter that indicates a noise level in an environment.

14. The communication device of claim 8, wherein the communication device is a mobile phone.

15. The communication device of claim 8, further comprising:

a user interface to enable the communication device to activate text-to-speech conversion based at least in part on the noise level exceeding the threshold value.

16. A non-transitory computer-readable storage medium storing instructions that when executed by a communication device cause the communication device to:
establish an audio connection between the communication device and a far-end communication device via a communication network;
detect an audio noise level of an environment surrounding the communication device;
provide an option to activate text-to-speech conversion on a display screen of the near-end communications device based at least in part on the detected audio noise level;
activate text-to-speech conversion in response to the option to activate text-to-speech conversion being selected;
prompting for text input based at least in part on the activating;
generate an audio signal that conveys a message of the communication device based at least in part on the prompting, and
transmit the audio signal to the far-end communication device using the audio connection, wherein during the transmission an audio input to the communication device is muted.

17. The computer-readable storage medium of claim 16, wherein the instructions further cause the communication device to:
automatically activate text-to-speech conversion when the detected audio noise level exceeds a threshold value.

18. The computer-readable storage medium of claim 16, wherein the instructions further cause the communication device to:
enable the activation of text-to-speech conversion independently of the detected audio noise level.

19. The computer-readable storage medium of claim 16, wherein the instructions further cause the communication device to:
activate speech-to-text conversion to convert voice from the far-end communication device into text; and
wherein the display screen shows the text on the communication device.

20. The computer-readable storage medium of claim 16, wherein the instructions further cause the communication device to:
playback a pre-recorded message to the far-end communication device over the audio connection.

* * * * *